United States Patent
Rao et al.

(10) Patent No.: US 7,284,147 B2
(45) Date of Patent: Oct. 16, 2007

(54) RELIABLE FAULT RESOLUTION IN A CLUSTER

(75) Inventors: Sudhir G. Rao, Beaverton, OR (US); Bruce M. Jackson, Beaverton, OR (US); Mark C. Davis, Durham, NC (US); Srikanth N. Sridhara, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 10/649,269

(22) Filed: Aug. 27, 2003

(65) Prior Publication Data

US 2005/0050398 A1    Mar. 3, 2005

(51) Int. Cl.
*G06F 11/00* (2006.01)
(52) U.S. Cl. .................. 714/4; 709/223; 709/224
(58) Field of Classification Search .................. None
See application file for complete search history.

(56) References Cited

U.S. PATENT DOCUMENTS

| | | | |
|---|---|---|---|
| 5,909,540 A * | 6/1999 | Carter et al. | 714/4 |
| 6,031,528 A * | 2/2000 | Langfahl, Jr. | 715/734 |
| 6,363,416 B1 * | 3/2002 | Naeimi et al. | 709/209 |
| 6,581,166 B1 * | 6/2003 | Hirst et al. | 714/4 |
| 2002/0169861 A1 * | 11/2002 | Chang et al. | 709/223 |
| 2003/0018927 A1 * | 1/2003 | Gadir et al. | 714/4 |
| 2003/0182421 A1 * | 9/2003 | Faybishenko et al. | 709/224 |
| 2005/0086300 A1 * | 4/2005 | Yeager et al. | 709/204 |

FOREIGN PATENT DOCUMENTS

| | | |
|---|---|---|
| CN | 1175147 A | 3/1998 |
| JP | 10-093655 | 4/1998 |
| JP | 11-027326 | 1/1999 |
| WO | WO 00/74304 | 12/2000 |

OTHER PUBLICATIONS

"Application Level Ping"—http://www.samag.com/documents/s=1182/sam9901g/.*

* cited by examiner

*Primary Examiner*—Yolanda L. Wilson
(74) *Attorney, Agent, or Firm*—Lieberman & Brandsdorfer, LLC

(57) ABSTRACT

A method and system for localizing and resolving a fault in a cluster environment. The cluster is configured with at least one multi-homed node, and at least one gateway for each network interface. Heartbeat messages are sent between peer nodes and the gateway in predefined periodic intervals. In the event of loss of a heartbeat message by any node or gateway, an ICMP echo is issued to each node and gateway in the cluster for each network interface. If neither a node loss nor a network loss is validated in response to the ICMP echo, an application level ping is issued to determine if the fault associated with the absence of the heartbeat message is a transient error condition or an application software fault.

27 Claims, 4 Drawing Sheets

RELIABLE FAULT RESOLUTION IN A CLUSTER

BACKGROUND OF THE INVENTION

1. Technical Field

This invention relates to a method and system for resolving a fault in a cluster of multi-homed nodes in a computer, storage or communication system. More specifically, the invention relates to detecting and isolating the fault to determine origination of the fault to enable appropriate failover and repair action.

2. Description of the Prior Art

A node is a computer running single or multiple operating system instances. Each node in a computing environment has a network interface that enables the node to communicate in a local area network. A cluster is a set of one or more nodes coordinating access to a set of shared storage subsystems typically through a storage area network. It is common for a group of nodes to be in communication with a gateway for connection of a local area network to another local area network, a wider intranet, or a global area network. Each network interface and each gateway in a local area network includes an identifying IP address.

It is also known in the art for nodes in a local or wide area network to include two network interfaces, also known as "multi-homed nodes". The two network interface configuration provides redundant connectivity. Multi-homed nodes possess software that has access to both network interfaces. In the event of a failure associated with one of the network interfaces or the path along the network interface, the communication may switch to the second network interface on the same node, i.e. failover, without interruption or loss of data or of service from the node.

One form of resolving faults in a network is to require a peer node to issue or request a response protocol message on a suspect network interface. This solution attempts to solve the specific problem of validating the network path loss, as well as determining whether the fault is associated with a local or remote interface network. However, this technique relies on a potentially unreliable server on a remote node to issue a ping to the local network interface. This technique only functions under a single fault scenario. Any network fault or software fault affecting the remote node will provide a false conclusion on the local node.

Other solutions include redundant heartbeats and heartbeat channels between nodes, and link failures to resolve network faults. The use of redundant heartbeats and heartbeat channels solves the problem associated with reliable detection of a node loss, but fails in the area of network loss resolution. Similarly, link failures for resolving network faults are limited to provide network failover support, but do not function with an integrated high availability architecture with node and network monitoring and integrated node and network path failover support. In addition, the link failures technique does not have the ability to determine if a network partition has occurred for which the failover requires cluster reformation. Finally, such solutions which are typically provided by network drivers function only in a single subnet network topology.

The prior art methods for reliably detecting and resolving a fault are either in an efficient or unreliable in an integrated high availability architecture or cannot work reliably in a two node cluster. Accordingly, a method and system for reliable and efficient detection and resolution of a fault in an integrated high availability architecture is desired.

SUMMARY OF THE INVENTION

This invention comprises a method and system for resolving faults in a computer system.

In a first aspect of the invention, a method is provided for fault resolution in a computer system. A cluster is configured with a gateway for a network interface. An operating system Internet Control Message Protocol (ICMP) echo is issued to peer nodes in the cluster and to the gateway through the network interface in response to a heartbeat loss detection. A response to the echo is analyzed to determine location of a fault in the cluster. An application level ping may be issued to a peer node in response to receipt of the echo response within a predefined time interval and in response to a heartbeat beat loss detection.

In a second aspect of the invention, a computer system is provided with a cluster having a gateway configured for a network interface. An operating system ICMP echo is adapted to be issued to peer nodes in a cluster and to the gateway through the network interface in response to a heartbeat detection loss. A response from the echo is adapted to be analyzed for location of a fault in the cluster. An application level ping may be issued to a peer node in response to both receipt of the echo within a predefined time interval and a heartbeat loss detection.

In a third aspect of the invention, an article in a computer-readable medium is provided. The medium may be in the form of recordable data storage. Means in the medium are provided for issuing an operating system ICMP echo to a peer node in a cluster and to a configured cluster gateway through a network interface in response to a heartbeat loss detection. In addition, means in the medium are provided for analyzing a response message from the echo to determine location of a fault in the cluster. Means in the medium may also be provided for issuing an application level ping to a peer node in response to both receipt of an echo response within a predetermined time interval and a heartbeat detection loss.

Other features and advantages of this invention will become apparent from the following detailed description of the presently preferred embodiment of the invention taken in conjunction with the accompanying drawings.

DESCRIPTION OF THE PREFERRED EMBODIMENT

Overview

A cluster is configured with multi-homed nodes and at least one gateway for each network interface. Heartbeat messages are sent between peer nodes in the cluster in predefined periodic intervals. In response to loss of a heartbeat message, an ICMP echo is sent to all nodes and gateways in the cluster through both network interfaces. Sending the ICMP echo to all nodes in the cluster and the gateway assists in resolving whether or not a fault has occurred, a network partition has occurred, as well as determine the location of a node loss, a fault associated with a network interface, and/or a cable fault. An application level ping may be issued to further localize the fault. Accordingly, the use of the ICMP echo for each node and gateway in the cluster through each network interface reliably localizes a fault and provides for an efficient resolution of the fault condition.

Technical Details

Figure 1:
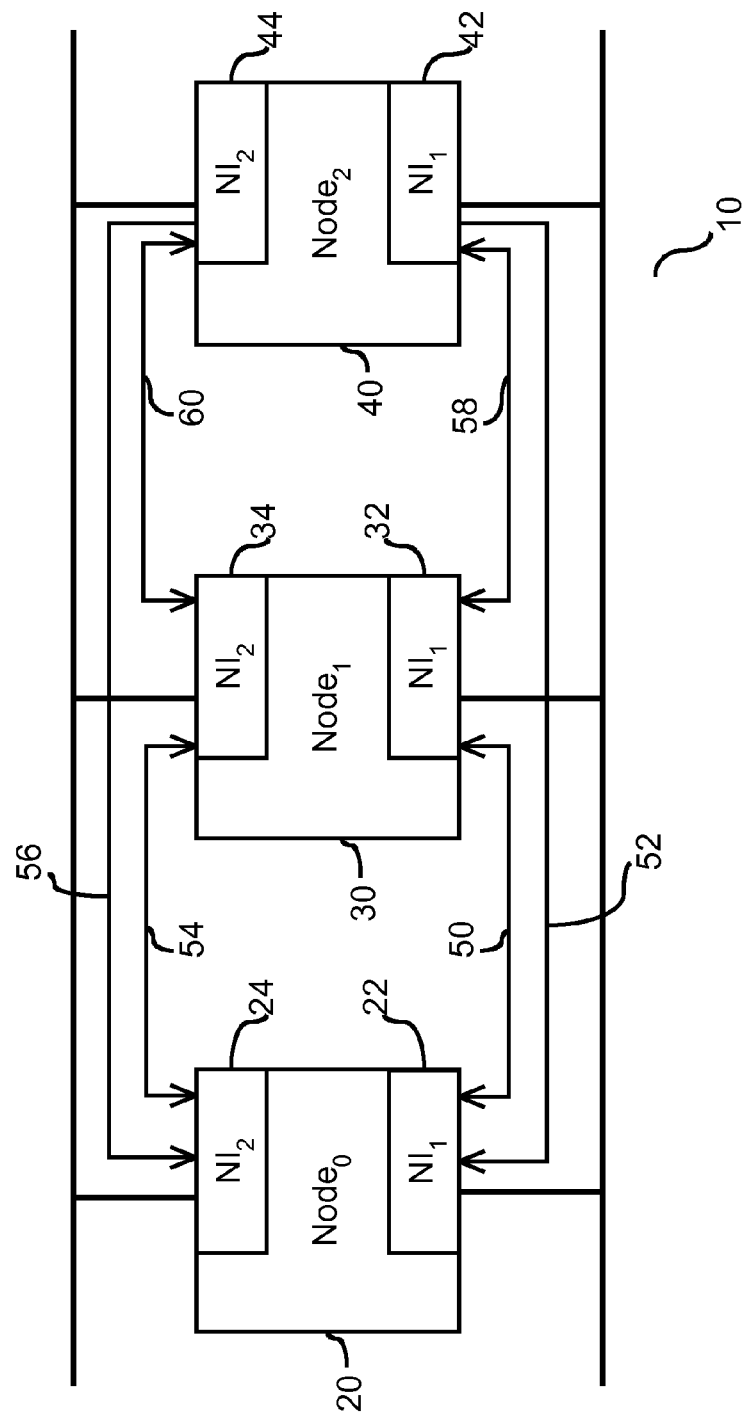
FIG. 1 is a block diagram of a prior art multi-node computing system.

It is known in the art to send heartbeat messages to peer nodes in a network at predefined intervals. FIG. 1 is a block diagram 10 of a prior art multi-node computing system. In this illustration, the arrow represent heartbeats and the straight lines represent network paths. There are three nodes in the system, $Node_0$ 20, $Node_1$ 30, and $Node_2$ 40. Each node is a multi-homed node. As shown in FIG. 1, $Node_0$ 20 has $network\ interface_1$ 22 and $network\ interface_2$ 24. Similarly, $Node_1$ 30 has $network\ interface_1$ 32 and $network\ interface_2$ 34, and $Node_2$ 40 has $network\ interface_1$ 42 and $network\ interface_2$ 44. As shown in FIG. 1, heartbeat messages are sent to adjacent peer nodes in a network. For example, $Node_0$ 20 sends first heartbeat messages 50 and 52 to $Node_1$ 30 and $Node_2$ 40, respectively, across the first network interface 22, 32, and 42, and sends second heartbeat messages 54 and 56 to $Node_1$ 30 and $Node_2$ 40, respectively, across the second network interface 24, 34, and 44. Similarly, $Node_1$ 30 sends first heartbeat messages 50 and 58 to $Node_0$ 20 and $Node_2$ 40, respectively, across the first network interfaces 22, 32, and 42, and sends second heartbeat messages 54 and 60 to $Node_0$ 20 and $Node_2$ 40 across the second network interfaces 24, 34, and 44, and $Node_2$ 40 sends first heartbeat messages 52 and 58 to $Node_0$ 20 and $Node_1$ 30 across the first network interface 22, 32, and 42 and sends second heartbeat messages 56 and 60 to $Node_0$ 20 and $Node_1$ 30 across the second network interface 24, 34, and 44. Essentially, each node sends independent periodic heartbeat messages to adjacent peer nodes across each network interface. The heartbeat message is bi-directional and exists between adjacent nodes to monitor faults within a node. However, the heartbeat messages are not capable of resolving a network loss. Accordingly, the heartbeat message is useful for determining faults on a nodal level only without resolving such faults, if any.

Figure 2:
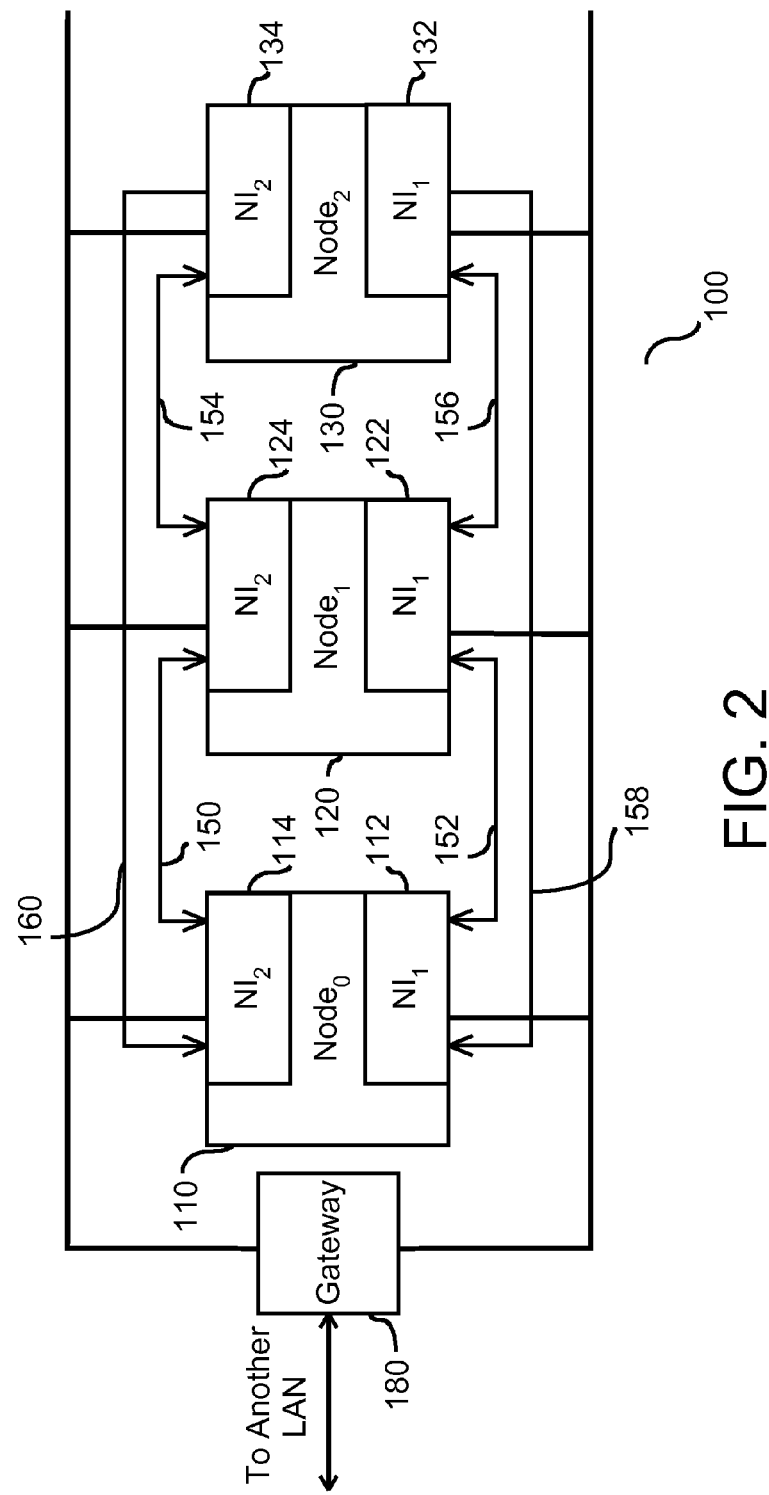
FIG. 2 is a block diagram of a multi-node computing system according to the preferred embodiment of this invention, and is suggested for printing on the first page of the issued patent.

FIG. 2 is a block diagram 100 of one example of a multi-homed multiple node computing system with one Gateway 180 for two network interfaces. In this illustration, there are three nodes in the system, $Node_0$ 110, $Node_1$ 120, and $Node_2$ 130. Each node is a multi-homed node. As shown in FIG. 2, $Node_0$ 110 has $network\ interface_1$ 112 and $network\ interface_2$ 114. Similarly, $Node_1$ 120 has $network\ interface_1$ 122 and $network\ interfaces$ 124, and $Node_2$ 130 has $network\ interface_1$ 132 and $network\ interface_2$ 134. In addition to the multiple network interfaces, the system has a Gateway 180 for communication with $network\ interface_1$ 112, 122, and 132 and with $network\ interface_2$ 114, 124, and 134. As shown in FIG. 2, heartbeat messages are sent to adjacent peer nodes in a network. For example, $Node_0$ 110 sends first heartbeat messages 152 and 158 to $Node_1$ 120 and $Node_2$ 130 across the first network interface 112, 122, and 132 and sends second heartbeat messages 150 and 160 to $Node_1$ 120 and $Node_2$ 130 across the second network interface 114, 124, and 134. Similarly, $Node_1$ 120 sends first heartbeat messages 152 and 156 to $Node_0$ 110 and $Node_2$ 130, respectively, across the first network interfaces 112, 122, and 132, and sends second heartbeat messages 150 and 154 to $Node_0$ 110 and $Node_2$ 130 across the second network interfaces 114, 124, and 134, and $Node_2$ 130 sends first heartbeat messages 156 and 158 to $Node_1$ 120 and $Node_0$ 110 across the first network interface 112, 122 and 132, and sends second heartbeat messages 154 and 160 to $Node_1$ 120 and $Node_0$ 110 across the second network interface 114, 124 and 134. In addition, the Gateway 180 is present along the network paths for both network interfaces. The Gateway 180 does not receive or send heartbeat messages since heartbeat messages are an application level protocol and the Gateway 180 is limited to operating system level protocols. The presence of the Gateway 180 enables detection of a fault on an operating system level, such as a fault associated with a network path or any component in the path, such as a card, switch or hub. Accordingly, each node sends periodic bi-directional heartbeat messages to adjacent peer nodes across each network interface to monitor faults within the associated network with a gateway present in the network topology.

Bi-directional heartbeat messages are used to monitor loss of communication with a node. In the event of loss of a heartbeat message by a peer node, an ICMP message is used for out-of-band messages related to network operation or failure thereof. An ICMP echo function sends an internet protocol packet on a round trip between hosts. Similarly, a ping which uses an application level protocol in place of an operating system protocol is used to send a message intended to be echoed back by the recipient. An application level ping places a unique sequence number on each packet it transmits, and reports which sequence numbers it receives back. This enables a system operator to determine if packets have been dropped, duplicated, or reordered. In addition, the ping function places a timestamp in each packet, which is echoed back and can be used to compute how long each packet exchange took, i.e. the round trip time. In addition, the ping reports other ICMP messages, such as if a router is declaring the target host unreachable.

Figure 3A:
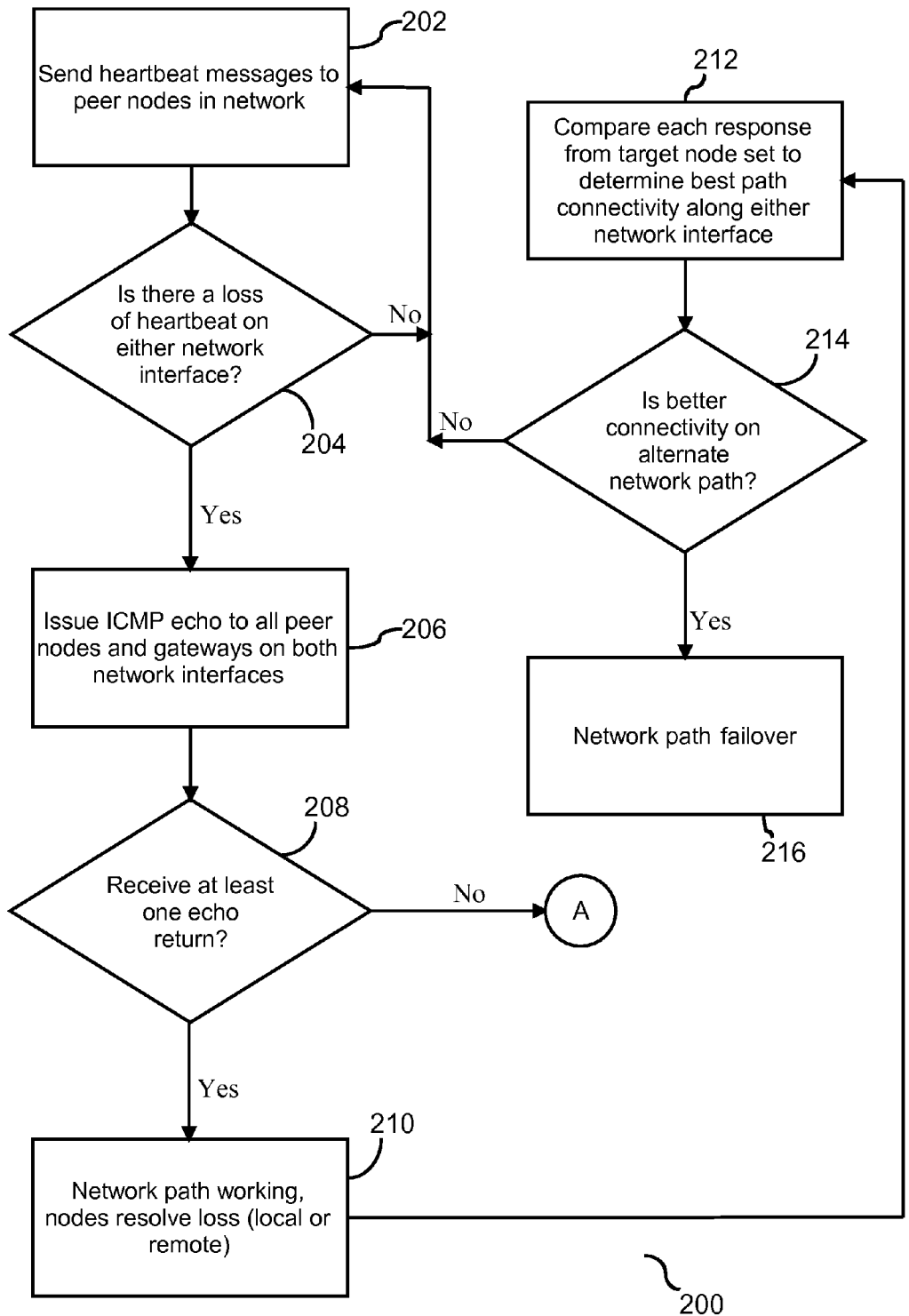
FIGS. 3A and 3B are a flow diagram illustrating the process of locating and resolving a fault in the computer system.
Figure 3B:
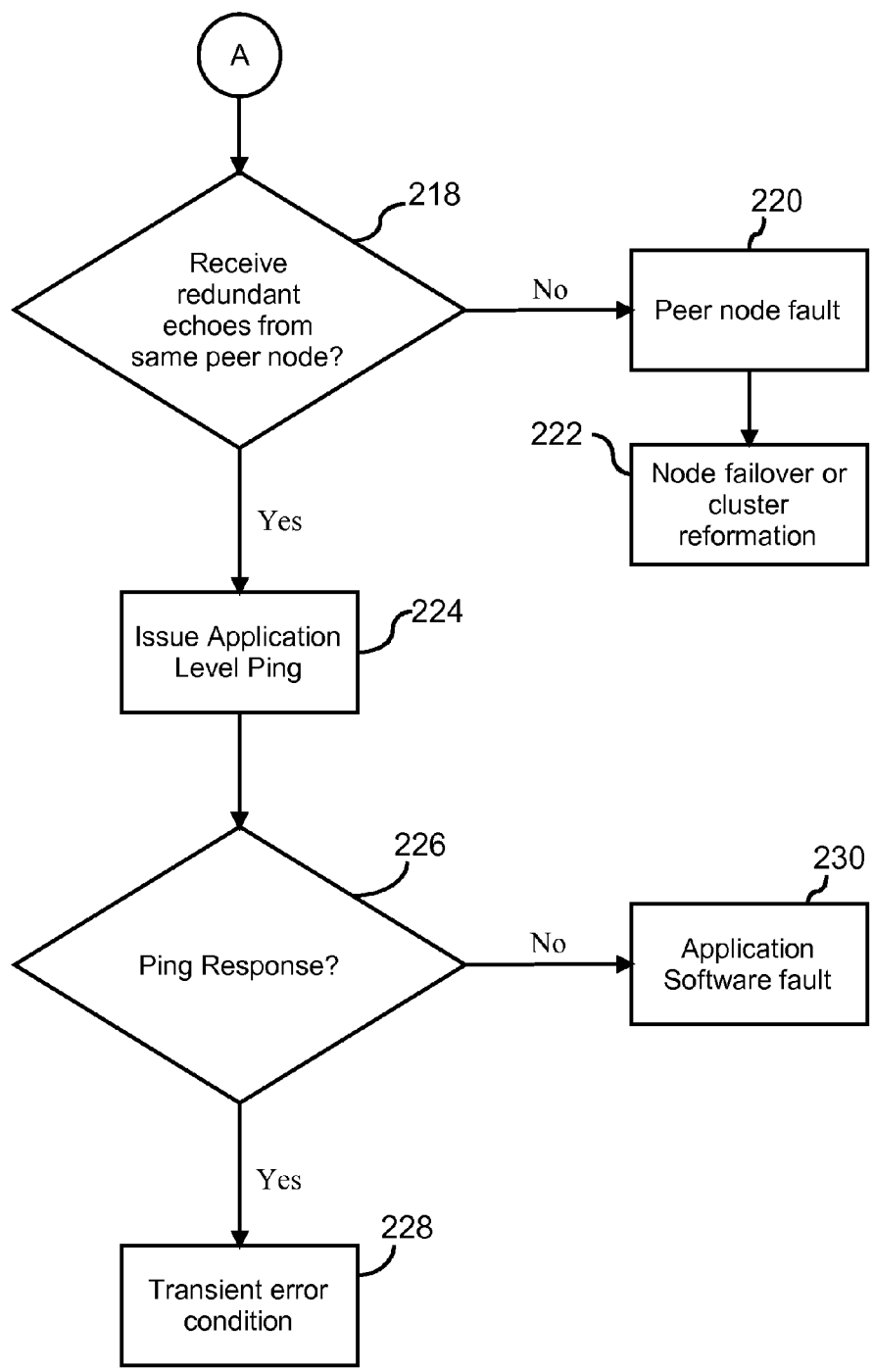

FIGS. 3A and 3B are a flow diagram 200 illustrating the process of locating and resolving a fault in the multi-homed multiple node computing system 100 as shown in FIG. 2 using heartbeat messages, ICMP echoes, and optionally an application level ping. Heartbeat messages are sent to peer nodes for monitoring fault detection 202. A test 204 is conducted to determine if there is a loss of a heartbeat on either network interface. A negative response to the query at step 204 is followed by a return to step 202 to continue the process of sending heartbeat messages at predefined intervals. However, a positive response to the query at step 204 is indicative of a loss of a heartbeat by a specific node. ICMP echoes are subsequently issued by the node detecting the heartbeat loss 206. The ICMP echo is sent from the node detecting the heartbeat loss to all peer nodes and gateways in the cluster on both network interfaces. One set of ICMP echoes is sent on the first network interface, and a second set of ICMP echoes is sent on the second network interface. The number of echoes issued in response to loss of a heartbeat is the following:

$$\text{Number of Echoes} = [(N-1) + (\text{Quantity of Gateways})] * (\text{Number of Network Interfaces}),$$

where N is representative of the number of nodes in the system. The ICMP echo is issued to the operating system on each node. Accordingly, issuance of the echo requests a response message from the operating system running on one or more nodes in the cluster of which one or more of the nodes may have a fault.

The ICMP echo responses function to validate suspicion of a node loss or a network path loss. Following issuance of the ICMP echo, a test is conducted to determine if at least one echo return has been received for a network interface 208. A positive response to the test at step 208 is indicative that the network path along that network interface is functioning 210. Thereafter, a comparison of echo responses from the target node set for the network interfaces is conducted to determine the best path of connectivity along either network interface within the cluster 212. A test is subsequently conducted to determine if there is improved connectivity on the alternate network path 214. A negative response to the test at step 214 is followed by a return to step 202: However, a positive response to the query at step 214 results in a network path failover 216. Accordingly, if at least one echo return is produced a network connectivity problem is localized and resolved.

However, if a response to the test at step 208 is negative, this is indicative that the fault does not reside in the network path. Therefore, a test is conducted to determine if redundant echoes from the same peer node have been returned 218. A negative response to the test at step 218 is validation of a peer node fault pertaining to node hardware and/or operating system fault of the peer node 220. Thereafter, a node failover or cluster reformation is conducted 222. In the event neither a node loss nor a network loss is validated by the ICMP echo response, an application level ping is issued 224. Following the issuance of the ping, a test is conducted to determine if there is a response to the ping 226. A ping response is suggestive of a transient error condition 228, whereas absence of a ping response within a predefined time interval is suggestive of an application software fault 230. If the fault is not in the network connectivity, subsequent tests are conducted to determine and locate alternative faults that may reside with a node fault, a transient error condition, or an application software fault. Accordingly, localizing the fault helps determine the best course of action for automatic recovery and/or administrative repair action.

Advantages Over the Prior Art

A gateway with a routing table for both network interfaces and associated messages is configured within the physical computer system and application software. The routing table enables efficient transmission of messages and echoes across each of the networks. In addition, the configuration of the computer system with a gateway for each network interface enables control issuance of an ICMP echo to a specific network. Finally, the placement of the gateway within the network configuration assists in determining whether a suspected fault resides in the network or a node within the network. In particular, it helps resolve faults in two node clusters and network partitions in general. Accordingly, placement of the gateway within the computer system provides enhanced efficiency and reliability in locating and resolving a fault in the system.

Alternative Embodiments

It will be appreciated that, although specific embodiments of the invention have been described herein for purposes of illustration, various modifications may be made without departing from the spirit and scope of the invention. In particular, the invention should not be limited to the architectural layout of the system shown in FIG. 2. Each network may include multiple gateways and alternate designs for connecting the nodes and gateways. In addition, the network topology could be a single subnet, a dual subnet, or redundant physical networks. Accordingly, the scope of protection of this invention is limited only by the following claims and their equivalents.

We claim:

1. A method for fault resolution in a computer system, comprising:
   configuring a cluster with a gateway for a network interface;
   issuing an operating system ICMP echo to peer nodes in said cluster and to said gateway through said network interface in response to a heartbeat loss detection; and
   analyzing a response from said echo to determine location of a fault in said cluster.

2. The method of claim 1, wherein the step of analyzing a response from said echo includes receiving said response and determining an intended recipient of said echo.

3. The method of claim 2, wherein receipt of a return of said echo from said peer nodes for said network interface within a predefined time interval is indicative of operation of said network interface.

4. The method of claim 2, wherein receipt of a return of said echo from said gateway for said network interface within a predefined time interval is indicative of operation of said network interface.

5. The method of claim 2, wherein absence of return of said echo from said peer nodes for said network interface within a predefined time interval is indicative of a fault selected from a group consisting of: a peer node fault, a network fault local to the peer node, and combinations thereof.

6. The method of claim 1, further comprising the step of issuing an application level ping to a peer node in response to both receipt of said echo response within a predefined time interval and said heartbeat beat loss detection.

7. The method of claim 1, further comprising comparing an echo response from a target node set for each network interface.

8. The method of claim 7, wherein the step of comparing an echo response from a target node set for each network interface includes criteria selected from the group consisting of: maximum availability of nodes in said network, availability of said gateway in said network, and combinations thereof.

9. A multi-node computer system, comprising:
   a cluster with a gateway configured for a network interface;
   an operating system ICMP echo adapted to be issued to peer nodes in a cluster and to said gateway through said network interface in response to a heartbeat loss detection; and
   a response from said echo adapted to be analyzed for location of a fault in said cluster.

10. The system of claim 9, wherein analysis of said response from said echo includes determination of an intended recipient of said echo.

11. The system of claim 10, wherein receipt of a return of said echo from said peer nodes for said network interface within a predefined time interval is indicative of operation of said network interface.

12. The system of claim 10, wherein receipt of a return of said echo from said gateway for said network interface within a predefined time interval is indicative of operation of said network interface.

13. The system of claim 11, wherein absence of receipt of a return of said echo from peer nodes for said network interface within a predefined time interval is indicative of a fault selected from a group consisting of: a peer node fault, a network fault local to the peer node, and combinations thereof.

14. The system of claim 9, further comprising an application level ping adapted to be issued to a peer node in response to both receipt of said echo within a predefined time interval and a heartbeat beat loss detection.

15. The system of claim 9, further comprising a comparison tool adapted to compare an echo response from a target node for each network interface.

16. The system of claim 15, wherein said comparison tool determines a network interface path based upon criteria selected from the group consisting of: maximum availability of nodes in said network, availability of said gateway in said network, and combinations thereof.

17. An article comprising:
a computer-readable medium having computer-readable instructions stored thereon executable by a processor, said computer-readable instructions comprising:
computer-readable instructions for issuing an operating system ICMP echo to a peer node in a cluster and to a configured cluster gateway through said network interface in response to heartbeat loss detection; and
computer-readable instructions for analyzing a response message from said echo to determine location of a fault in said cluster.

18. The article of claim 17, wherein the medium is a recordable data storage medium.

19. The article of claim 17, wherein said computer-readable instructions for analyzing a response message from said echo includes receiving said response and determining an intended recipient of said echo.

20. The article of claim 17, further comprising computer-readable instructions for issuing an application level ping to a peer node in response to both receipt of an echo response within a predetermined time interval and a heartbeat loss detection.

21. The article of claim 17, further comprising computer-readable instructions for comparing an echo response from a target node set for each network interface.

22. The article of claim 21, wherein the instructions for comparing an echo response from a target node set for each network interfaces includes criteria selected from the group consisting of: maximum availability of nodes in said network, availability of said gateway in said network, and combinations thereof.

23. A method for localizing a fault in a computer system, comprising:
sending periodic heartbeat messages to peer nodes in a network;
issuing an operating system ICMP echo to said peers nodes and a gateway through a network interface in response to a heartbeat loss; and
determining a location of a fault in said cluster through a response echo.

24. The method of claim 23, wherein the step of issuing an operating system ICMP echo includes sending said echo on a first network interface and a second network interface for multi-homed nodes.

25. The method of claim 23, wherein said loss is selected from a group consisting of: a node loss, and network path loss.

26. The method of claim 23, further comprising comparing echo responses to determine a best path of connectivity.

27. The method of claim 23, further comprising localizing a network connectivity problem in response to return of at least one echo.

* * * * *